United States Patent
Sakada

(10) Patent No.: US 8,667,352 B2
(45) Date of Patent: Mar. 4, 2014

(54) SEMICONDUCTOR DEVICE AND METHOD FOR VALIDATING A STATE THEREOF

(75) Inventor: Oleksandr Sakada, Munich (DE)

(73) Assignee: Freescale Semiconductor, Inc., Austin, TX (US)

( * ) Notice: Subject to any disclaimer, the term of this patent is extended or adjusted under 35 U.S.C. 154(b) by 334 days.

(21) Appl. No.: 12/990,873

(22) PCT Filed: May 27, 2008

(86) PCT No.: PCT/IB2008/052082
§ 371 (c)(1),
(2), (4) Date: Nov. 3, 2010

(87) PCT Pub. No.: WO2009/144531
PCT Pub. Date: Dec. 3, 2009

(65) Prior Publication Data
US 2011/0060954 A1    Mar. 10, 2011

(51) Int. Cl.
*G01R 31/28* (2006.01)
(52) U.S. Cl.
USPC .................... 714/732; 714/738; 714/725
(58) Field of Classification Search
USPC ............ 714/732, 725, 718, 25, 734, 738, 30
See application file for complete search history.

(56) References Cited

U.S. PATENT DOCUMENTS

| | | | | |
|---|---|---|---|---|
| 5,309,446 | A | * | 5/1994 | Cline et al. ............... 714/718 |
| 5,329,471 | A | * | 7/1994 | Swoboda et al. .......... 703/23 |
| 5,600,658 | A | * | 2/1997 | Qureshi .................. 708/530 |
| 5,668,947 | A |   | 9/1997 | Batcher |
| 6,085,336 | A | * | 7/2000 | Swoboda et al. .......... 714/30 |
| 6,457,145 | B1|   | 9/2002 | Holmberg et al. |
| 6,496,946 | B2| * |12/2002 | Bannatyne et al. ........ 714/25 |
| 6,625,688 | B1|   | 9/2003 | Fruehling et al. |
| 7,168,065 | B1|   | 1/2007 | Naccache et al. |
| 7,242,116 | B2|   | 7/2007 | Kawazu et al. |
| 7,254,817 | B2|   | 8/2007 | Kawahara |
| 2007/0226570 | A1 | | 9/2007 | Zou et al. |

OTHER PUBLICATIONS

International Search Report and Written Opinion correlating to PCT/IB2008/052082 dated Mar. 5, 2009.

\* cited by examiner

*Primary Examiner* — Fritz Alphonse

(57) ABSTRACT

A semiconductor device comprises processing logic arranged to execute program instructions. The semiconductor device further comprises signature generation logic arranged to receive at least one value from at least one internal location of the semiconductor device, and to generate a current signature value, based on the at least one received value. Validation logic is arranged to validate the current signature value generated by the signature generation logic. The processing logic is further arranged, upon execution of a signature validation instruction, to enable the validation of the current signature value provided by the validation logic.

24 Claims, 2 Drawing Sheets

SEMICONDUCTOR DEVICE AND METHOD FOR VALIDATING A STATE THEREOF

FIELD OF THE INVENTION

The field of this invention relates to a semiconductor device, and more particularly to a method and apparatus for validating a state of a semiconductor device.

BACKGROUND OF THE INVENTION

Safety requirements for automotive electronics are being standardized in a number of application segments. An example of application segments includes chassis applications, which United States government legislation requires to be standardized for each new vehicle from 2012. A further example is electric power steering.

Automotive braking applications and steering applications also both require sophisticated electronic solutions that allow switching to a safe state in case a malfunction is detected. Accordingly, awareness of safety issues, for example by a system-on-chip (SoC), is of increasing importance in today's vehicular applications, although the usage of such devices is not limited to such applications. However, the safety level required differs from application to application. For example, some applications may require Safety Integrity Level (SIL) 3, whilst other applications may require SIL 2. Safety Integrity Levels are defined as a relative level of risk-reduction provided by a safety function, or as a specific target level for risk reduction. Four SIL levels are defined by the International Standard IEC 61508, ranging from SIL 4, being the most dependable, to SIL 1, being the least dependable.

Different levels of safety may require varying amounts of redundancy of building blocks and connectivity within the SoC. As a result of this, known SoCs are designed with a specific SIL in mind. However, the need to develop multiple SoC architectures to support multiple SILs makes the development of safety aware devices complex and costly.

In order to demonstrate that a device is applicable to a particular SIL level, it is necessary to demonstrate that the device is capable of detecting a defined proportion of faults, depending on the particular SIL level—50%, 60%, 90%, or 99%, for example. As will be appreciated, for some devices, such as processor devices comprising complex cores, the only feasible way of demonstrating that the device is capable of detecting a defined proportion of faults is to use a fault simulation tool, which simulates faults on the device using gate-level code for the device under control of the fault simulator. It is known that, in some instances, the fault simulation tool may inject one or more faults into the device, and thereafter identify those faults that may be detected by the device and those that may not. In this manner, an SIL level of the device may be demonstrated based on the results from the fault simulator.

In addition to the need for demonstrating SIL levels for devices, sophisticated core and device self-test applications are becoming a key technical requirement by vehicle manufacturers who employ such semiconductor devices.

Self test applications and fault simulation tests, such as those that may used to demonstrate the SIL level of a device, are typically required to be executed concurrently with the normal functionality of the device under test, in order to provide realistic results. A problem with performing such tests is that, in order to achieve a suitably accurate fault simulation test (e.g. >90% fault coverage), such testing typically requires extensive test code sizes and lengthy test code execution times. Unfortunately, the use of extensive test code sizes and lengthy test code execution times makes the implementation and performing of such tests impractical, if not unfeasible.

It is known that techniques for speeding up fault simulation significantly affect the reliability of the tests. For example, omitting hardware and software modules of the device from the test run may result in propagation of faults and/or mask properties that are not being reliably tested. Furthermore, limiting the injection of faults within a specific module for a given test may cause faults in other modules, which will not be counted since they do not relate to the module under test, causing significantly more tests to be implemented, or the declared achieved coverage underestimated.

Another known technique for speeding up fault simulation, known as multi-strobing, comprises checking, or 'strobing', locations within a device more frequently after the injection of a fault than would be performed by the test code of the device under normal operating conditions. Although this enables fault detection by the test code of the device to be identified more quickly, and thus enabling fault simulation to be accelerated, because strobing is performed more frequently than would be the case under normal conditions, the results are unrealistic.

Consequently, such known techniques for speeding up fault simulation are unacceptable, particularly when needing to demonstrate an SIL level of a device, or for self-testing processes within safety applications, due to the consequent effect on the reliability of the tests. In particular, in order for such fault simulation tests for safety applications to be considered sufficiently accurate and reliable, they should perform:

simulation of all the real and complete part(s) of the device that are within the scope of fault detection and propagation;

(ii) simulation of all the software that comprises core/device initialisation, test code, and propagation of detected faults to predefined place(s) within the device; and (iii) comparison of the results during simulation and during execution of the test code on the real device in the same way and in the same manner.

However, in order to make such fault simulation tests both commercially feasible and practical, test code sizes and test code execution times are required to be significantly reduced relative to those currently used or required for current safety applications.

SUMMARY OF THE INVENTION

Embodiments of the invention provide a semiconductor device, a processing system and a method for validating a state of a semiconductor device as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
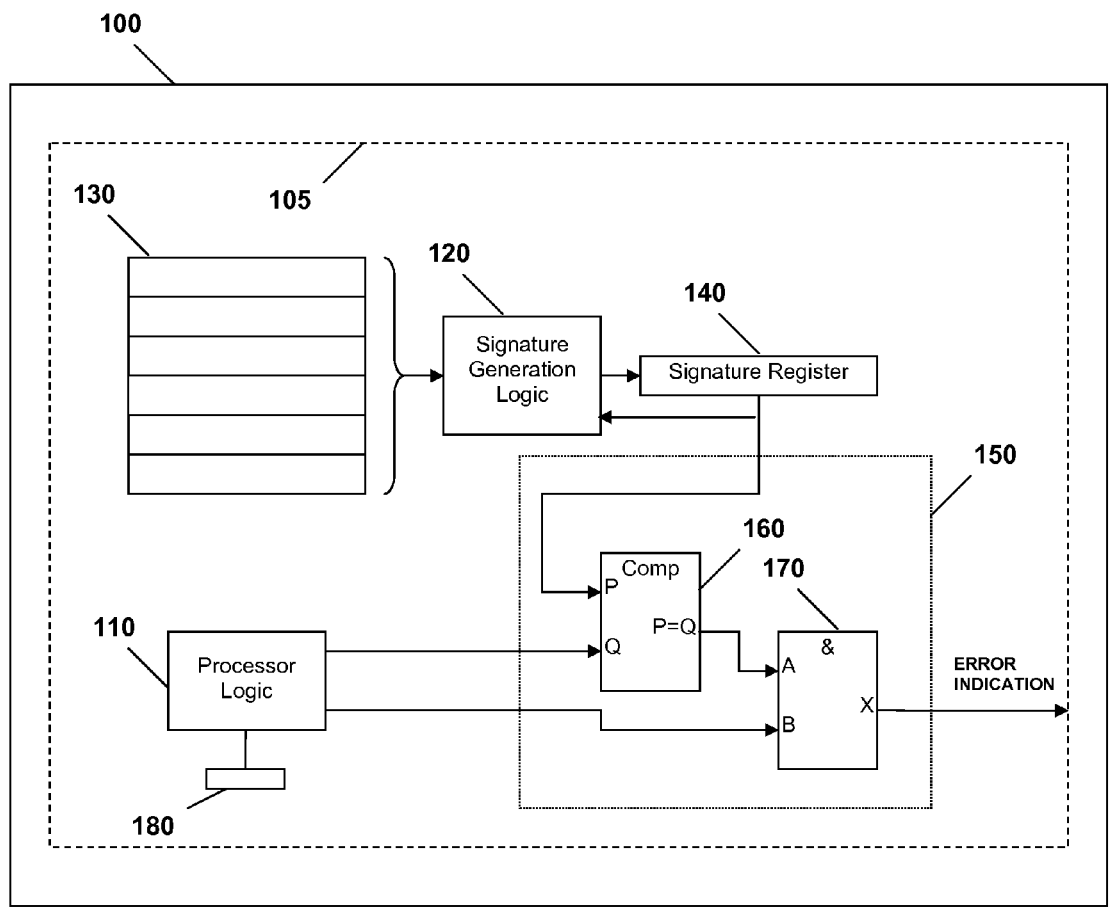
FIG. 1 illustrates an example of a semiconductor device according to some embodiments of the invention.

Referring now to FIG. 1, there is illustrated an example of a semiconductor device 100 according to some embodiments of the present invention. For the example illustrated in FIG. 1, the semiconductor device 100 comprises a processing system 105, such as a System-on-Chip (SoC) for a vehicle safety application. The processing system 105 comprises processing logic 110 arranged to execute program instructions. The semiconductor device 100, or more particularly for the illustrated example the processing system 105, further comprises signature generation logic 120 arranged to receive at least one value from at least one internal location 130 of the semiconductor device 100, and to generate a current signature value, based on the at least one received value. The semiconductor device 100, or more particularly for the illustrated example the processing system 105, further comprises validation logic 150 arranged to validate the current signature value generated by the signature generation logic 120, and to output an error indication based on the result of validating the current signature value. The processing logic 110 is further arranged, upon execution of a signature validation instruction, to enable the validation of the current signature value by the validation logic 150.

In this manner, the signature generation logic 120 generates a signature representative of the values received from one or more internal locations 130 within the semiconductor device 100. In particular, the provision of signature generation logic 120 discrete from the processing logic 110 enables the current signature value to be generated substantially concurrently to the processing logic 110 executing program instructions, such as test code or the like. In this manner, a substantially up-to-date current signature value may be always made available, without a need for the current signature value to be computed through software executed by the processing logic 110. In this manner, the processing logic 110 is free to execute program instructions whilst a current signature value is kept up-to-date, thereby significantly minimising both test code size, and the test code execution times.

Furthermore, the provision of validation logic 150, discrete from the processing logic 110, further enables the current signature value to be validated, without the need for the validation to be performed through software executed by the processing logic 110. In this manner, with the exception of processing a single signature validation instruction, the processing logic 110 is free to execute program instructions whilst the current signature value is validated, further minimising both test code size and test code execution times.

As will be appreciated, since the signature generation logic 120 is able to maintain a substantially up-to-date current signature value, whilst the processing logic 110 concurrently executes program instructions, a signature representing the current state of the internal locations from which values used to generate the signature were received is substantially always available for helping to determine whether errors within the semiconductor device 100 have occurred. Furthermore, since the processing logic 110 is only required to execute a single signature validation instruction in order to enable the validation logic 150 to validate the current signature value, such validation may be performed on a frequent basis, without imparting a significant burden on the processing logic 110. In this manner, the signature generation logic 120 and validation logic 150 enable the provision of timely error indication, which can significantly reduce the execution time for self-testing, and for running fault simulations, whilst minimising the impact on the size of the test code and the load on the processing logic 110. Accordingly, simulation of all the real and complete parts of the processing system 105 that are within the scope of fault detection and propagation, and all of the software that comprises core/device initialisation, test code, and propagation of detected faults to predefined places within the device (e.g. those locations from which values used to generate the signature value are received), may be accomplished in a feasible timescale, and whilst maintaining a practical test code size.

As previously mentioned, the validation logic 150 outputs an error indication based on the result of validating the current signature value. The error indication may for example be capable of being made available to an external device, such as a fault simulation tool. Furthermore, the error indication may in addition, or as an alternative, be operably coupled to fault detection logic within the semiconductor device 100, In the this manner, the error indication may form an integral part of the fault detection and propagation functionality of the processing system 105. Accordingly, since the error indication may be used both by integral fault detection and propagation functionality of the processing system 105, and by external fault simulation tools, validation of the current signature value may be performed during fault simulation and during normal execution of test code for the processing system 105 in the same way and in the same manner, as known. Thus, an accurate and reliable fault simulation may be performed for the processing system 105 in a realistic and feasible timeframe, and whilst maintaining a practical test code size.

As previously mentioned, the signature generation logic 120 may be arranged to receive at least one value from at least one internal location within the semiconductor device 100. It is contemplated that substantially any internal location of the semiconductor device 100 may be used to provide one or more values with which to generate the current signature value. As will be appreciated the selection of one or more location(s) from which values are used to generate the current signature value may affect the observability of faults, and detectability etc. in the semiconductor device 100. In particular, the selection may affect the detection of errors via the error indication provided by the validation logic 150. Thus, it is contemplated that the internal locations of the semiconductor device 100 may be selected to optimise the observability of such faults. By way of example only, it is envisaged that the signature generation logic 120 may be arranged to receive values from one or more of:
  (i) an instruction register for the processor logic;
  (ii) internal buffers of an address generator module;
  (iii) outputs of internal flip-flops of an integer unit (e.g. multiplier, divider, etc.) that are usually difficult to observe;
  (iv) inputs/outputs of internal gates of multiplexers, which in their turn reside in multiple modules of the core/device;

It is envisaged that the signature generation logic 120 may generate the current signature value in any suitable manner. In particular, it is contemplated that the signature generation logic 120 may compress a vector comprising all the received values from the one or more internal locations to a vector of a smaller size. For example, the signature generation logic 120 may utilise cyclic redundancy check (CRC) compression;

polynomial calculations based, for example, on a multi-input shift register with a feedback loop, etc.

For the example illustrated in FIG. 1, the signature generation logic 120 is operably coupled to a signature register 140, and is arranged to store the most recently generated current signature value in the signature register 140. In this manner, the signature register 140 contains, and may make available, the most recently generated current signature value. For example, the validation logic 150 is also operably coupled to the signature register 140, and arranged to read and validate the current signature value stored within the signature register 140.

For example, the signature generation logic 120 may be further arranged to generate the current signature value further, based at least partially on a previously generated current signature value. Accordingly, for the illustrated example, the signature generation logic 120 is arranged to receive as an input the content of the signature register 140. In this manner, the generated current signature value comprises historical information from one or more previously generated current signature value(s). As a result, the most recent signature value is capable of comprising information relating to historical 'states' of the internal locations within the semiconductor device 100, from which the values with which the current signature value is generated are received. Accordingly, a validation of the most recent current signature value may still be applicable for historical states of the semiconductor device 100, thereby enabling less frequent accurate validations to be performed.

For example, the signature generation logic 120 may be arranged to generate the current signature value substantially synchronously with the execution of instructions by the processing logic 110. For example, the signature generation logic 120 may be arranged to generate a current signature value once every 'n' instructions that are executed by the processing logic 110, for example every one or two instructions executed by the processor logic 110. Alternatively, it is envisaged that the signature generation logic 120 may be arranged to generate a current signature value substantially synchronously to a clock signal of the semiconductor device 100. Such a clock signal may be synchronous to the processing logic 110, or some other module within the processing system. Alternatively, it is contemplated that such a clock signal may be externally configurable, for example by a fault simulation tool, thereby enabling a generation rate of current signature values to be externally configurable.

For the illustrated example in FIG. 1, the validation logic 150 comprises comparator logic 160 arranged to receive the current signature value generated by the signature generation logic 120, and compare the current signature value with a reference signature value, and to output an indication of whether the current signature value substantially matches the reference signature value. In particular, for the illustrated example, the comparator logic 160 is operably coupled to the signature register 140, and arranged to receive the most recent current signature value stored therein.

For example, and for the illustrated example in FIG. 1, the signal processing logic 110 is arranged, upon execution of a signature validation instruction, to extract a reference signature value from the signature validation instruction, and thereafter to provide the reference signature value to the validation logic 150. Accordingly, for the illustrated example, the comparator logic 160 may be arranged to receive the reference signature value from the processing logic 110. For example, the processing logic 110 may be arranged, upon execution of a signature validation instruction, to extract a reference signature value from the signature validation instruction. In this manner, a reference value is made available to the processing logic 110 substantially immediately, thereby minimising the workload of the processing logic 110. Alternatively, the processing logic 110 may be arranged, upon execution of a signature validation instruction, to retrieve a reference signature value from a memory location 180 within the semiconductor device 100. In this manner, although some additional processing may be required in order for the processing logic 110 to retrieve the reference signature value from memory, the reference signature does not need to comprise a 'fixed' value. Accordingly, the signature validation instruction is capable of being utilised within instruction loops, etc.

It is contemplated that the reference signature may comprise an expected representation of the current state and, if applicable for specific embodiments, historic states of internal locations within the semiconductor device. Accordingly, when compared to the current signature value, it can be determined whether the representation of the current and historic states of the corresponding internal locations (from which the values on which the generation of the current signature value was based were received) provided by the current signature value matches the expected representation provided by the reference signature value. If the two representatives do not match, it can be assumed that an error has occurred within the semiconductor device 100, and an appropriate indication may be output by the comparator logic 160.

As will be appreciated, in the case where the generated current signature value comprises historical information from previously generated current signature values, in order for the current signature value to comprise a predictable value, it may be necessary for the signature generation logic 120 to be initialised, for example to clear any historical data. This enables the signature generation logic 120 to commence generating signature values from a predictable starting point. It is envisaged that this may be performed upon initialisation of the processing system 105, or at any other known, and therefore predictable, instance. However, in some embodiments of the invention, initialisation of the signature generation logic 120 may only be required to be performed once, during execution of, for example, test code, following which the processor logic 110 may execute signature validation instructions multiple times.

For the example illustrated in FIG. 1, the validation logic 150 further comprises indicator logic 170, operably coupled to the comparator logic 160. The indicator logic 170 is further operably coupled to the processing logic 110 and arranged, upon receipt of an enabling signal from the processing logic 110, to output a validation indication based on the indication output by the comparator logic 160. For the illustrated example, the indicator logic 170 comprises an 'AND' gate, and the processing logic 110 is arranged, upon execution of a signature validation instruction, to output an enabling signal comprising, say a logical '1' value. In this manner, upon receipt of the enabling signal, the indicator logic 170 outputs a value substantially mirroring the indication output by the comparator logic 160. Conversely, when no enabling signal is received from the processing logic 110, such that a logical '0' value is received from the processing logic 110, the output of the indicator logic 170 is held to a logical '0' value, irrespective of the indication output by the comparator logic 160. In this manner, invalid indications provided by the comparator logic 160, for example between signature validation instructions, do not cause invalid error indications to be output.

As mentioned, the provision of signature generation logic 120 that is discrete from the processing logic 110 enables the current signature value to be generated substantially concurrently to the processing logic 110 executing program instructions, such as test code or the like. In this manner, a substantially up-to-date current signature value may be always made available, without the need for the current signature value to be computed through software executed by the processing logic 110. In this manner, the processing logic 110 is free to execute program instructions whilst a current signature value is kept up-to-date, thereby significantly minimising both test code size, and the test code execution times.

Furthermore, the provision of validation logic 150 discrete from the processing logic 110 may further enable the current signature value to be validated, without the need for the validation to be performed through software executed by the processing logic 110. In this manner, with the exception of processing a single signature validation instruction, the processing logic 110 is free to execute program instructions whilst the current signature value is validated, thereby further minimising both test code size and test code execution times.

Since the signature generation logic 120 is able to maintain a substantially up-to-date current signature value, whilst the processing logic 110 concurrently executes program instructions, a signature representing the current state of the internal locations from which values used to generate the signature were received is substantially always available for helping to determine whether one or more errors within the semiconductor device 100 have occurred. Furthermore, since the processing logic 110 is only required to execute a single signature validation instruction in order to enable the validation logic 150 to validate the current signature value, such validation may be performed on a frequent basis, without imparting a significant burden on the processing logic 110. In this manner, the signature generation logic 120 and validation logic 150 may enable the provision of timely error indication, which can significantly reduce the execution time for self-testing, and for running fault simulations, whilst minimising the impact on the size of the test code and the load on the processing logic 110. Accordingly, simulation of all the real and complete parts of the processing system 105 that are within the scope of fault detection and propagation, and of all the software that comprises core/device initialisation, test code, and propagation of detected faults to predefined places within the device (e.g. those locations from which values used to generate the signature value are received) may be accomplished in a feasible timescale, and whilst maintaining a commercially practical test code size.

As previously mentioned, the validation logic 150 outputs an error indication based on the result of validating the current signature value. For example, the error indication may be capable of being made available to an external device, such as a fault simulation tool. Furthermore, the error indication may in addition, or as an alternative, be operably coupled to fault detection logic within the semiconductor device 100. In this manner, the error indication may form an integral part of the fault detection and propagation functionality of the processing system 105. Accordingly, since the error indication may be used by both integral fault detection and propagation functionality of the processing system 105, and by external fault simulation tools, validation of the current signature value may be performed during fault simulation and during normal execution of test code for the processing system 105.

Accordingly, embodiments of the invention enable high accuracy (>90% fault coverage) fault simulation possible within commercially feasible timescales, and with manageable test code sizes. In particular, the signature validation instruction may be utilised multiples times during the execution of a test program without impacting on the size and execution time of the test code, and enabling earlier fault detection, thus reducing fault simulation run times. In addition, development time for software based self-test may be significantly reduced, since results of fault simulations will be available faster and be more accurate.

Figure 2:
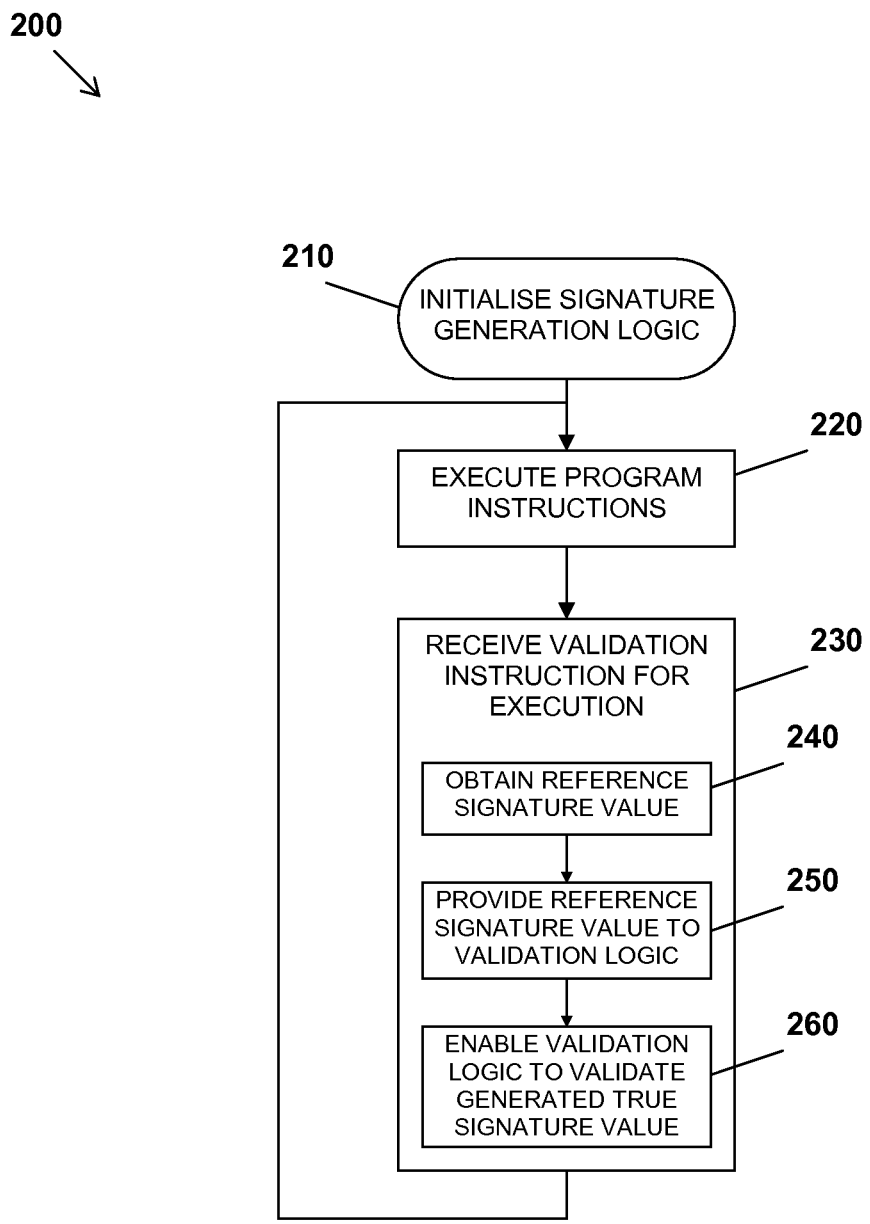
FIG. 2 illustrates a simplified flowchart of an example of a method for validating a state of a semiconductor device according to some embodiments of the invention.

Referring now to FIG. 2, there is illustrated a simplified flowchart 200 of an example of a method for validating a state of a semiconductor device according to some embodiments of the present invention, for example as may be implemented by the processing system 105 of FIG. 1.

The method starts at step 210, with an initialisation of signature generation logic arranged to generate a current signature value based on at least one value from at least one internal location of the semiconductor device. Next, in step 220, program instructions, such as test code, are executed. Upon receipt of a signature validation instruction, in step 230, the method moves to step 240 where a reference signature value is obtained. As mentioned, the reference signature value may be provided within the signature validation instruction, or may be retrieved from a memory location identified by the signature validation instruction. Next, in step 250, the reference signature value is provided to the signature validation logic. The method then moves to step 260, where validation logic is enabled to validate a current signature value generated by the signature generation logic. The method then loops back to step 220, with the execution of program instructions.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be a type of connection suitable to transfer signals from or to the respective nodes, units or devices, for example via intermediate devices. Accordingly, unless implied or stated otherwise the connections may for example be direct connections or indirect connections. Also, the semiconductor device 100 may be implemented on a single die and be implemented as a system on a chip.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The term 'program,' as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles, such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A semiconductor device comprising processing logic arranged to execute program instructions, whereby the semiconductor device further comprises:
   signature generation logic arranged to receive at least one value from at least one internal location of the semiconductor device, generate a current signature value based on the at least one received value concurrently to the processing logic executing program instructions, and store the current signature value at a signature register; and
   validation logic operably coupled to the signature register and arranged to read and validate the current signature value stored within the signature register;
   wherein the processing logic is arranged, upon execution of a signature validation instruction, to enable the validation of the current signature value by the validation logic.

2. The semiconductor device claim 1 wherein the signature generation logic is arranged to receive at least one value from at least one internal location from a group consisting of:
   (i) an instruction register for the processing logic;
   (ii) internal buffers of an address generator module;
   (iii) outputs of internal flip-flops of an integer unit; and
   (iv) inputs/outputs of internal gates of multiplexers.

3. The semiconductor device of claim 1 wherein the signature generation logic is arranged to generate the current signature value by performing at least one operation from a group consisting of:
   (i) cyclic redundancy check (CRC) compression; and
   (ii) polynomial calculations.

4. The semiconductor device of claim 2 wherein the signature generation logic is operably coupled to a signature register, the signature generation logic arranged to store the generated current signature in the signature register; the validation logic is operably coupled to the signature register and arranged to read and validate the current signature value stored within the signature register.

5. The semiconductor device of claim 2 wherein the signature generation logic is arranged to generate the current signature value by performing at least one operation from a group consisting of:
   (i) cyclic redundancy check (CRC) compression; and
   (ii) polynomial calculations.

6. The semiconductor device of claim 1 wherein the signature generation logic is arranged to generate the current signature value further based at least partially on a previously generated current signature value.

7. The semiconductor device of claim 6 wherein the signature generation logic is arranged to generate the current signature value substantially synchronously with execution of instructions by the processing logic.

8. The semiconductor device of claim 6 wherein the validation logic comprises comparator logic arranged to receive the current signature value generated by the signature generation logic, compare the current signature value with a reference signature value, and to output an indication of whether the current signature value matches the reference signature value.

9. The semiconductor device of claim 1 wherein the signature generation logic is arranged to generate the current signature value substantially synchronously with execution of instructions by the processing logic.

10. The semiconductor device of claim 9 wherein the signature generation logic is arranged to generate a current signature value for every n instructions executed by the processing logic.

11. The semiconductor device of claim 1 wherein the signature generation logic is arranged to generate the current signature value substantially synchronously to a clock signal of the semiconductor device.

12. The semiconductor device of claim 11 wherein the clock signal is externally configurable.

13. The semiconductor device of claim 1 wherein the validation logic comprises comparator logic arranged to receive the current signature value generated by the signature generation logic, compare the current signature value with a reference signature value, and to output an indication of whether the current signature value matches the reference signature value.

14. The semiconductor device of claim 13 further wherein the comparator logic is arranged to receive the reference signature value from the processing logic.

15. The semiconductor device of claim 13 wherein the validation logic further comprises indicator logic, operably coupled to the comparator logic; the indicator logic operably coupled to the processing logic and arranged, upon receipt of an enabling signal from the processing logic, to output a validation indication based on the indication output by the comparator logic.

16. The semiconductor device of claim 1 wherein the processing logic is arranged, upon execution of a signature validation instruction, to extract a reference signature value from the signature validation instruction, and to provide the reference signature value to the validation logic.

17. The semiconductor device of claim 1 wherein the processing logic is arranged, upon execution of a signature validation instruction, to retrieve a reference signature value from a memory location within the semiconductor device, and to provide the reference signature value to the validation logic.

18. A processing system comprising:
processor logic arranged to execute program instructions;
signature generation logic arranged to receive at least one value from at least one internal location of the semiconductor device to generate a current signature value, based on the at least one received value, concurrently to the processing logic executing program instructions; and
validation logic comprising comparator logic arranged to receive the current signature value, compare the current signature value with a reference signature value, and to output an indication of whether the current signature value matches the reference signature value;
wherein the processor logic is arranged, upon execution of a signature validation instruction, to enable the validation of the current signature value by the validation logic.

19. A method for validating a state of a semiconductor device, comprising:
initialising signature generation logic at the semiconductor device, the signature generation logic to generate a current signature value based on at least one value from at least one internal location of the semiconductor device, and to store the current signature value at a signature register;
executing program instructions at the semiconductor device; and
upon receipt of a validation instruction to be executed, enabling validation logic at the semiconductor device, the validation logic arranged to read and validate the current signature value stored within the signature register.

20. A method for validating a state of a semiconductor device, comprising:
initialising signature generation logic at the semiconductor device, the signature generation logic to generate a current signature value based on at least one value from at least one internal location of the semiconductor device;
executing program instructions at the semiconductor device; and
upon receipt of a validation instruction to be executed, enabling validation logic at the semiconductor device, the validation logic comprising comparator logic arranged to receive the current signature value, compare the current signature value with a reference signature value, and to output an indication of whether the current signature value matches the reference signature value.

21. A semiconductor device comprising processing logic arranged to execute program instructions, whereby the semiconductor device further comprises:
signature generation logic arranged to receive at least one value from at least one internal location of the semiconductor device and to generate a current signature value based on the at least one received value concurrently to the processing logic executing program instructions; and
validation logic arranged to validate the current signature value generated by the signature generation logic;
wherein the processing logic is arranged, upon execution of a signature validation instruction, to extract a reference signature value from the signature validation instruction, to provide the reference signature value to the validation logic, and to enable the validation of the current signature value by the validation logic.

22. A semiconductor device comprising processing logic arranged to execute program instructions, whereby the semiconductor device further comprises:
signature generation logic arranged to receive at least one value from at least one internal location of the semiconductor device and to generate a current signature value based on the at least one received value concurrently to the processing logic executing program instructions; and
validation logic arranged to validate the current signature value generated by the signature generation logic;
wherein the processing logic is arranged, upon execution of a signature validation instruction, to retrieve a reference signature value from a memory location within the semiconductor device, to provide the reference signature value to the validation logic, and to enable the validation of the current signature value by the validation logic.

23. A semiconductor device comprising processing logic arranged to execute program instructions, whereby the semiconductor device further comprises:
signature generation logic arranged to receive at least one value from at least one internal location of the semiconductor device and to generate a current signature value based on the at least one received value concurrently to the processing logic executing program instructions; and
validation logic arranged to validate the current signature value generated by the signature generation logic;
wherein the processing logic is arranged, upon execution of a signature validation instruction, to enable the validation of the current signature value by the validation logic; and
wherein the signature generation logic is arranged to generate the current signature value by performing a cyclic redundancy check (CRC) compression.

24. A semiconductor device comprising processing logic arranged to execute program instructions, whereby the semiconductor device further comprises:
signature generation logic arranged to receive at least one value from at least one internal location of the semiconductor device and to generate a current signature value based on the at least one received value concurrently to the processing logic executing program instructions; and validation logic arranged to validate the current signature value generated by the signature generation logic;

wherein the processing logic is arranged, upon execution of a signature validation instruction, to enable the validation of the current signature value by the validation logic; and wherein the signature generation logic is arranged to generate the current signature value by performing polynomial calculations.

* * * * *